United States Patent [19]

Weman

[11] 4,413,794
[45] Nov. 8, 1983

[54] LOCKING DEVICE REACTING TO INERTIA FORCES FOR RETRACTORS

[75] Inventor: Per O. Weman, Heverlee, Belgium

[73] Assignee: N.V. Klippan S.A., Heverlee-Leuven, Belgium

[21] Appl. No.: 325,882

[22] Filed: Nov. 30, 1981

[30] Foreign Application Priority Data

Dec. 27, 1980 [DE] Fed. Rep. of Germany ....... 3049255

[51] Int. Cl.³ ............................................. B65H 75/48
[52] U.S. Cl. ............................... 242/107.4 A; 280/806
[58] Field of Search ................ 242/107.4 A; 280/806; 297/478

[56] References Cited

U.S. PATENT DOCUMENTS

| Re. 29,688 | 7/1978 | Kondziola | 242/107.4 A |
| B 487,427 | 3/1976 | Stephenson et al. | 242/107.4 A |
| 3,901,461 | 8/1975 | Stephenson et al. | 242/107.4 |
| 4,135,410 | 1/1979 | Filderman | 297/478 X |
| 4,231,591 | 11/1980 | Close | 242/107.4 A X |

FOREIGN PATENT DOCUMENTS

| 2645456 | 8/1976 | Fed. Rep. of Germany | 242/107.4 A |
| 1195028 | 5/1970 | United Kingdom | 297/478 |

*Primary Examiner*—Stuart S. Levy
*Assistant Examiner*—Lloyd D. Doigan
*Attorney, Agent, or Firm*—Roger H. Criss

[57] ABSTRACT

A locking mechanism for seat belt retractors responding to movement or accelerations of a vehicle, including a freely movable inertia body and a pivotable pawl, in which a mechanism on the pawl can engage the inertia body and movement of the inertia body is limited by a means arranged next to the inertia body.

3 Claims, 5 Drawing Figures

LOCKING DEVICE REACTING TO INERTIA FORCES FOR RETRACTORS

BACKGROUND OF THE INVENTION

The invention concerns a locking mechanism for safety belt retractors responding to movements and/or accelerations of the vehicle, with an annular inertia body held freely movable by means of an annular support secured on the housing and with a pivotally mounted pawl moved by the inertia body and arranged next to the latter for releasing and/or locking safety elements, e.g. the ratchet with a belt roller, inflating an air cushion, extending a head rest.

Such locking mechanisms with inertia-dependent sensors are already known, e.g. from U.S. Pat. No. 3,901,461 or German application No. 27 31 072. There the inertia body is a ball which is held freely movable in a trough and whose surface is in contact with a lug, likewise having a trough, on a pawl. In an accident, when a force is exerted on the vehicle and thus also on the belt roller, the ball moves relative to the trough, forcing the pawl into engagement with the ratchet wheel. The known support is designed as a ring, so that the uncertainty zone of the engagement between pawl and ratchet wheel can be kept small. It is also possible to effect the locking in a relatively short time by this type of support in the known locking mechanism and also the return of the inertia ball into its neutral position.

But in all known mechanisms of this type, the upper end of the movable inertia body describes a rather slow arc before the engagement takes place. This results necessarily in a considerable relative movement between the pawl, on the one hand, and the inertia body arranged as a rule under it, on the other hand. It is thus readily understandable that the factors influencing the response of the locking mechanisms, in other words, the sensitivity of the locking mechanism, is variable, and that the friction of the parts moving relative to each other is not always constant.

Particularly belt rollers for safety belts are, as known, mass-produced articles where minor deviations from the tolerances occur and are also permissible. It can readily happen that one inertia body has a slightly rougher surface than the other; and the same holds true for the friction surface of the pawl. These minor deviations increase their effect, however, e.g. when the friction surfaces are contaminated with dust, water, frozen condensed water, or a thin oil film.

It would be desirable to improve the locking mechanism of the above-described device whose mode of operation and function depend less on friction, and whose sensitivity and the corresponding response can therefore be more easily controlled.

SUMMARY OF THE INVENTION

In accordance with this invention, there is provided a locking mechanism for safety belt retractors responding to movements and/or accelerations of the vehicle, including an inertia body held freely movable by an annular support secured on the retractor housing and a pivotably mounted pawl moved by the inertia body and arranged next to the same for releasing and/or locking safety elements, in which means are provided on the pawl which can be brought into engagement with the inertia body and means are secured on the housing for limiting movement of the inertia body, such means being arranged next to the inertia body.

The above problem is solved according to the invention in that a means is provided on the pawl which can be brought in engagement with the inertia body, and that a means fixed on the housing for limiting the movement of the inertia body is arranged next to the latter. In a preferred first embodiment of the invention, the means provided on the pawl has a hole in the pawl for the passage of a means for the loose connection of the pawl with the inertia body, as well as an abutment for this means, and the support is arranged between the pawl and the inertia body. Preferably the inertia body has in this embodiment a central bore, carries at its bottom end a rather sharp annular groove, and is so held on a support designed as a sharpened supporting collar that it can tilt under the action of shocks or other accelerations.

Such a tiltable sensor means is already known from German application No. 28 03 454, but there two inertia bodies are provided which are superposed and tiltable relative to each other, where one inertia body is moreover mounted on gimbals. Nevertheless the substantially linear support (along a circle) between the collar and the inertia body ensures a rapid response, so that the technical perfection of such a sensor, and thus of an acceleration-dependent automatic belt roller is improved. Sliding movement between the support and the inertia body is avoided, and there is more precision insofar as the belt roller locks with more precision.

In the above-described embodiment of the invention, the inertia body is not completely free in the preferably trough-shaped support, but has according to another advantageous embodiment of the invention as a means for the loose connection of the pawl with the inertia body a rod protruding through the support and at least partly through or into the inertia body and is held movably in the latter. This rod thus protrudes through the hole provided in the pawl and also, seen from the bottom to the top, through a hole provided centrally in the inertia body, and is rotatably mounted by cup-shaped bearings by means of corresponding thickenings at the ends of the rod in such a way that the inertia body can still tilt relative to the support but is nevertheless loosely connected with the pawl. The effect and the advantage achieved according to the invention are due to the fact that the pawl engages a flywheel for releasing or locking safety elements, not after passing through a relative large arc, e.g. the upper end of the inertia body, but immediately and directly from the start of the tilting movement of the inertia body.

Due to this even faster response, the new locking mechanism becomes more independent of contaminations, which are mostly unavoidable in the above-described manner in belt rollers after prolonged use. Means have therefore been provided by simple and inexpensive measures to make the belt rollers for safety belts, and more generally the locking mechanisms, more reliable, ensuring even greater safety for the users at low cost.

In a further development of the invention it is of advantage if the means provided on the pawl has at least one stirrup which is loosely connected with the inertia body and protrudes through an opening provided centrally in the support and at least partly into the inertia body. It is possible to make the said rod for the loose connection between pawl and inertia body so long that it extends from underneath the pawl to the upper end of the inertia body arranged above. But it is also possible to use a correspondingly shorter rod which is rotatably mounted in the lower range of the inertia body with a preferably central bore though it then still protrudes some distance through the inertia body, then through the opening in the support, and then further down through the pawl. In the other embodiment described last the rod is replaced by a stirrup, which is preferably fixedly mounted on the pawl. Seen from the bottom to the top, this stirrup, or two parallel stirrups in another embodiment arranged in a distance from each other, protrude upward through the opening in the support and into a recess provided centrally in the inertia body in which a means for the loose connection of the pawl or stirrup with the inertia body is provided. This means can be, e.g., a pin which is secured on the inertia body and extends through the stirrups or through the one stirrup, so that the inertia body can turn about the pin in the support when it tilts. Instead of the pin there can also be used a ball and socket joint, so that the inertia body can tilt in different directions in the support.

It is advisable according to the invention if the means for limiting the movement of the inertia body is the trough-shaped support, if the support is arranged between the pawl and the inertia body, and if the fulcrum of the pawl is provided at the extreme end opposite the ratchet point. The pawl is preferably designed as an angular piece, and in the above described preferred embodiment of the invention, this pawl is mounted rotatably at one end and is provided with a point at the other end in such a way that, when the inertia body tilts, the point of the pawl can be pushed into the teeth of a flywheel in such a way that the locking of the belt rollers or any other function is effected by stopping a flywheel or the like. The angle by which the pawl is bent in these embodiments can be between 20 and 90 degrees, preferably between 30 and 60 degrees. Naturally other forms of the pawl are also possible, depending on the arrangement of the desired sensor in a release mechanism.

Another embodiment according to the invention is characterized in that a ring is arranged at the rim of a hole provided in the pawl, that the means for the loose connection of the pawl with the inertia body is a sleeve-shaped projection on the inertia body, and that the pawl is arranged between the support and the inertia body. The shape of the inertia body can be similar to a ball or to a cube or any other similarly shaped geometric structure. The embodiments where the support carrying the ring is trough-shaped are provided on the outside at the bottom of the inertia body with a surface in such a way that it serves at the upper outer edge of the trough as a means for limiting the movement. In other words, this trough or its upper edge, in cooperation with the surface formed on the outside at the bottom of the inertia body, is the support for the means for limiting the movement of the inertia body. In all these embodiments, the support is fixed on the housing and is properly aligned in the assembly of a belt roller.

In the embodiment with the sleeve-shaped projection on the inertia body there is no separate part, such as the rod, nor a part secured on the pawl, such as a stirrup, protruding through the opening in the pawl, but the sleeve-shaped projection is so secured on the inertia body itself, preferably at its bottom end, that it passes through the opening in the pawl and bears on the ring of the support. At the outer bottom end, this projection has a sort of ring flange whose outside diameter is smaller than the diameter of the opening in the pawl. In this case, the inertia body may likewise tilt relative to the support, and the effect of the bottom flange on the sleeve is achieved with simple means whereby the rim is touched on the outside of the hole provided in the pawl and is entrained corresponding to the movement of the inertia body. In other words, it is also possible in this embodiment to obtain an immediate response of the pawl by tilting the inertia body. Here too, the inertia body does not have to cover a long arcuate path until the pawl engages the teeth of a release mechanism, but this engagement advantageously takes place immediately from the start of the tilting movement of the inertia body. According to the foregoing embodiment it is of particular advantage if the inertia body is tiltably mounted on the support.

In another expedient embodiment of the invention, the inertia body is a ball, the end of the pawl opposite the ratchet point is designed as a cup-shaped trough for engaging and holding the ball, the fulcrum of the pawl is provided next to the trough, and the means for limiting the movement is a ring fixed on the housing and arranged above the ball. In the presently known locking mechanisms, the pawl is arranged mostly above the inertia body and is lifted during its movement (by accelerations, e.g. in an accident) after a lateral movement of the inertia body out of the support with the disadvantageous dependence on the friction values. With the measures according to the invention, however, and this is true for all embodiments, the pawl does not engage the teeth of a gear wheel (for example) after the inertia body has covered a certain path, but the means with which the pawl can be brought in engagement with the inertia body is so designed that the inertia body moves the pawl immediately after the start of the movement. In the last mentioned embodiment, the ball is arranged at the trough-shaped end of the pawl on the side opposite the ratchet point relative to the fulcrum. Preferably the shape of the trough is adapted to the outer surface of the ball like a cup, so that, when the ball moves, rolls or tilts from the support at the time of accident, the pawl must likewise necessarily move due to the occurring accelerations. To prevent the ball from moving too far by the accelerations, a ring secured on the housing is provided as a stop, whose inside diameter is so dimensioned that the ball can move a certain distance from the support in different directions so far that the pawl engages the teeth of a gear wheel in a movement.

Another embodiment of the invention is characterized in that the inertia body is a ball inserted in a plastic part, that the plastic part is in engagement with the pawl, that the support has a ring collar which protrudes through a hole provided in the pawl and inside a bead at the bottom end of the plastic part, and that the fulcrum of the pawl is provided next to the hole and the plastic part. In this embodiment the inertia body is a combination between a cubic or plateshaped part and a ball. Since plastic materials can be shaped very easily, as known, and can also be processed inexpensively in large quantities, it is advisable to produce a plastic part with a corresponding bearing in the form of the above described bead (for example by extrusion) and to secure a lead ball on the latter by locking, and to increase the response sensitivity further by arranging the center of gravity of the entire inertia body rather high above the ring collar. In this embodiment the ring collar protrudes preferably through an opening provided in the pawl and supports there the bead with the plastic part arranged above it, whose end remote of the ratchet point is in contact with the end of the pawl. Since the fulcrum is arranged in a distance from this end of the pawl, on the one hand, and from the ratchet point, on the other hand, and next to the plastic part, as well as next to the ring collar of the support, tilting of the inertia body means immediate pressure on the pawl, so that the above-described advantages of the immediate response of the locking and release mechanism are achieved again. In this and in other embodiments it is again advisable if the means for limiting the movement is a plate arranged above the inertia body. In the case of a ball, the use of a ring-shaped body is more expedient, since the housing can then be made lower. In other embodiments of the inertia body, e.g. a cube, a plate may be the most expedient limiting means. In the first three embodiments, the limiting means is the stirrup connected with the pawl or the rod engaging the pawl.

The mechanism according to the invention provides inexpensive, reliable and easily mountable means with which an inertia-dependent sensor can be built with a rapid response, which remains substantially constant over a prolonged operating period.

BRIEF DESCRIPTION OF THE DRAWINGS

Other advantages, features and possible applications of the present invention will result from the following description of preferred embodiments in connection with the drawings.

DESCRIPTION OF THE PREFERRED EMBODIMENTS

Figure 1:
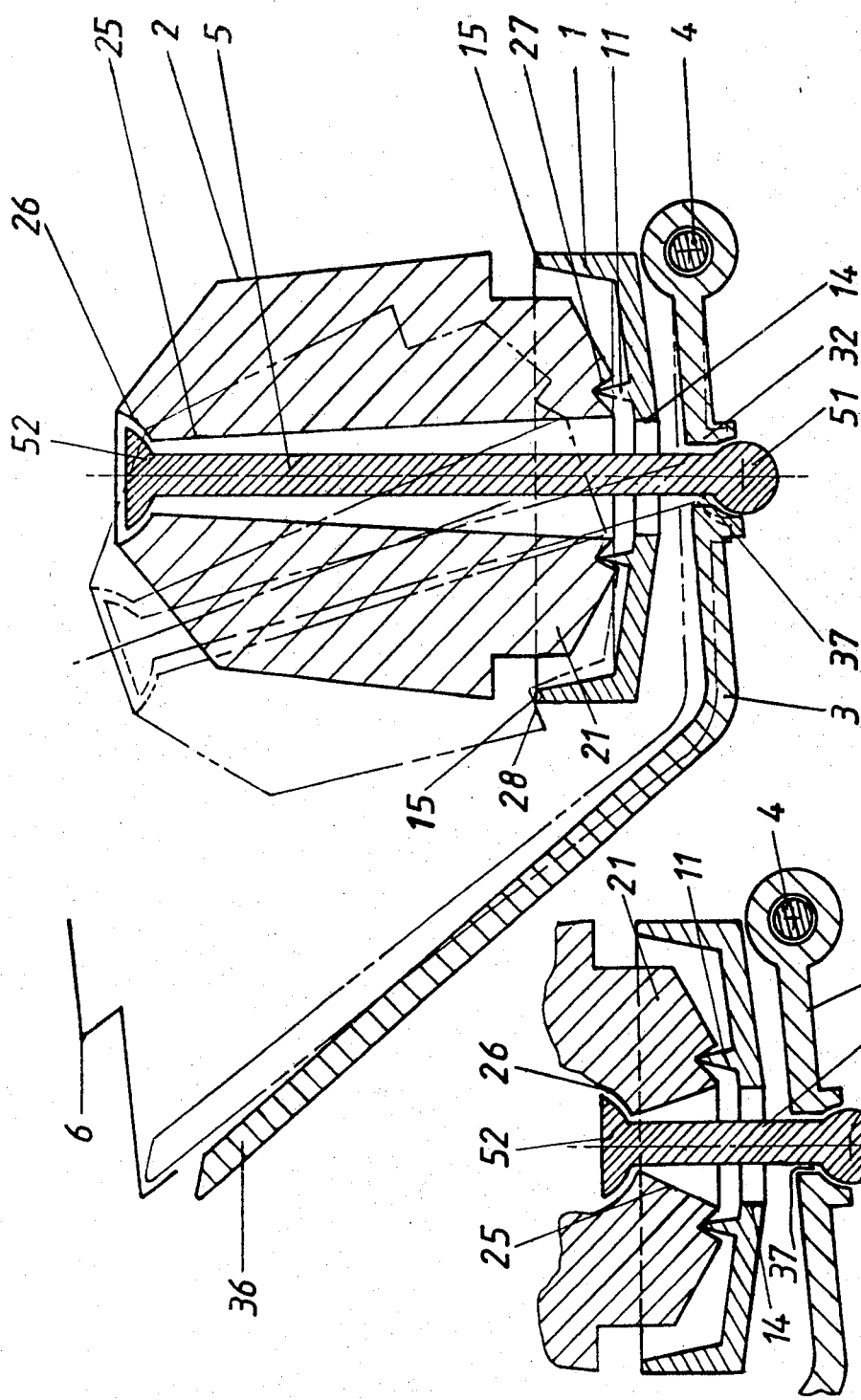
FIG. 1a shows schematically in a section and partly broken off the inertia body on the support and in loose connection with the pawl.
FIG. 1b shows a broken off partial view of another embodiment of the connecting rod for the loose connection of the pawl and inertia body.

With reference to the drawings, neither the vehicle nor the entire locking mechanism with the retractor (belt roller) and safety system are shown. Only a part of housing 1 can be seen, preferably from FIGS. 3 to 5. On this housing 1 can be seen in all figures the ring-shaped support 11, on which inertia body 2 or inertia body 24 in FIG. 4, or inertia body 26 in FIG. 5 is held freely movable. An angled pawl 3 is shown in all embodiments under the inertia body. The pawl has an end 36 that can be brought in engagement with a ratchet wheel 6 (which is shown in part) and a fulcrum 4 preferably in the form of a pin arranged either at the opposite end or in between and a pivot bearing embracing the latter. Furthermore the pawl in the embodiments of FIGS. 1a and 1b has next to fulcrum 4 an abutment 32 for holding a ball lug 51 at one end of a rod 5, as well as a hole 37 for the passage of rod 5.

According to FIG. 1a, the means provided on ratchet 3 is the above-described hole 37, as well as abutment 32. The inner surface of abutment 32 has the form of a partial ball for the form-locking reception of ball lug 51 of rod 5. The latter extends from underneath ratchet 3 through hole 37, then through an opening 14 in the trough-shaped support 1 which is secured on the housing, and then upwards through a central hole 25 in inertia body 2. At the upper end of the bore 25, as well as on the bottom of abutment 32 on the opposite side is arranged a cup-shaped recess 26, which widens so that the end 52 of rod 5 in the form of a partial ball can be movably mounted and retained. At the bottom of inertia body 2 there is a sharp annular groove 27, which is engaged by a relatively sharp-edged ring collar 11 arranged on support 1 projecting from its upper surface. The solid lines indicate the neutral position of the mechanism. Inertia body 2 with central bore 25 is held tiltably on ring collar 11.

If the locking mechanism is subjected from the left to a force at the time of accident according to the representation in FIG. 1a, inertia body 2 tilts into the position represented in dot-dashed lines, that is, it turns on the part of the section of ring collar 11 on the left so far until the left bottom surface 28 of inertia body 2 is flush with the upper edge 15 of support 1, so that the movement of inertia body 2 is limited. The limiting means is thus practically the support 1 itself or its upper edge 15. Immediately after the start of the tilting movement, the inertia body with cup surface 26 pulls pawl 3 over rod 5 by means of abutment 32, turning it about fulcrum 4, clockwise upward into the position between the teeth of ratchet wheel 6, shown likewise in dot-dashed lines. Even when the vehicle is turned over or upside down, ratchet point 36 moves between the teeth of gear wheel 6, e.g. by its weight, causing the locking of the retractor.

The same operation and the same sequence of movements also take place in the embodiment of FIG. 1b, where only rod 5 is made shorter, and the cup-shaped widening 26' to receive the end 52 of rod 5 is not arranged at the top, as in the embodiment of FIG. 1a, but further down in the area 21 of inertia body 2. Again there is shown opening 14 in the support, hole 37 in pawl 3, and central bore 25 in inertia body 2.

Figure 2:
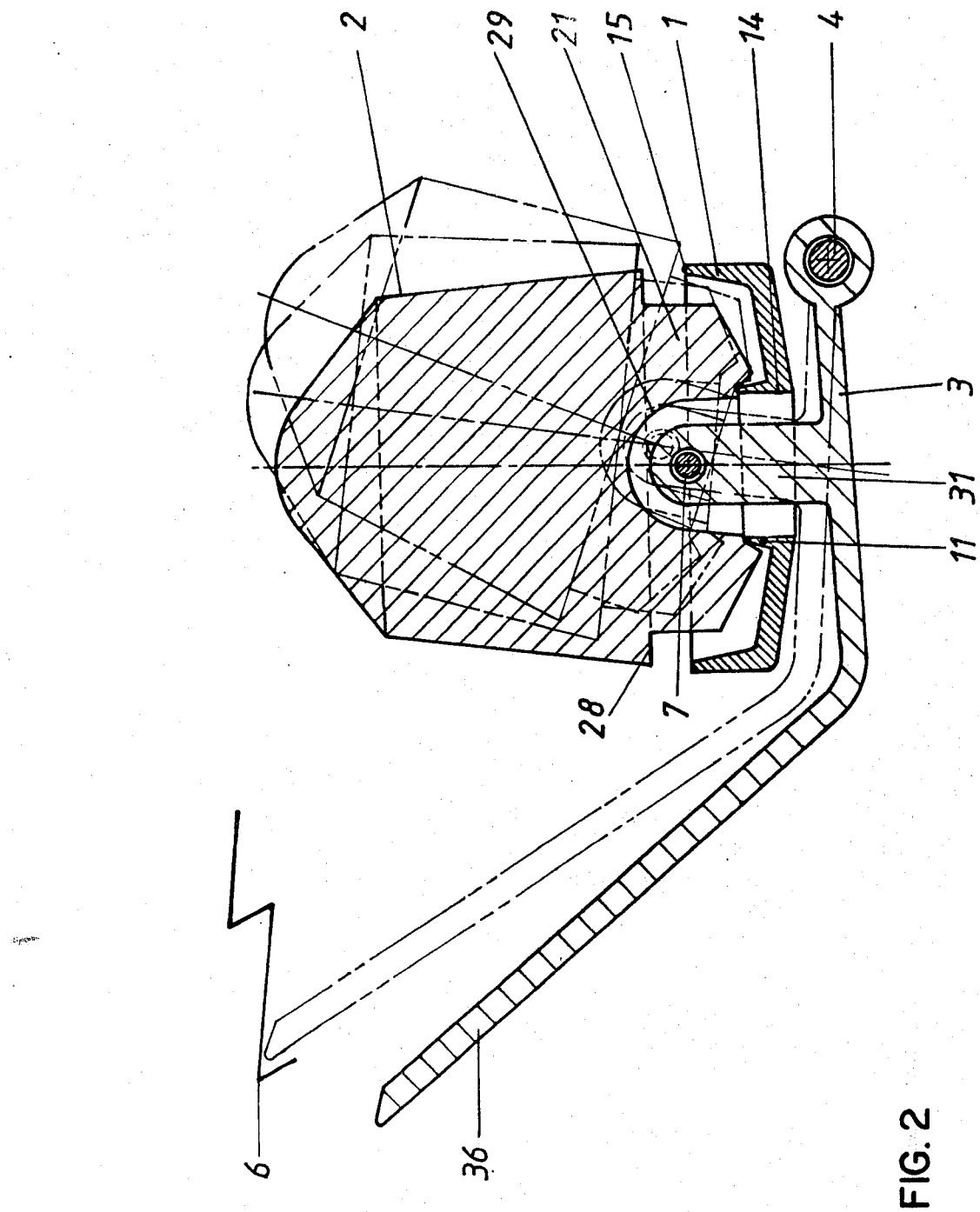
FIG. 2 shows a similar sectional view of another embodiment.

In the embodiment of FIG. 2, inertia body 2 has a different form, in particular it is not provided with a continuous central bore 25. Rather a recess 29 is provided in its bottom portion 21 in which is secured a pin 7 which holds stirrup 31 movably mounted on pawl 3 in such a way that the inertia body can turn about pin 7. As a result of a shock from the right, FIG. 2 shows the tilted position of inertia body 2 in dot-dashed lines. The entrainment of pawl 3 immediately after the start of the tilting movement is effected over the movement of pin 7 from the left bottom position into the position at the right top. Support 1 is here again trough-shaped and limits the movement of inertia body 2 over the engagement between the upper edge 15 with the lower engaging surface 28 of inertia body 2. The fulcrum is arranged in this embodiment too at the extreme end of pawl 3 opposite ratchet end 36.

In the embodiments of FIGS. 1a, 1b and 2, support 1 is arranged between pawl 3 and inertia body 2.

Figure 3:
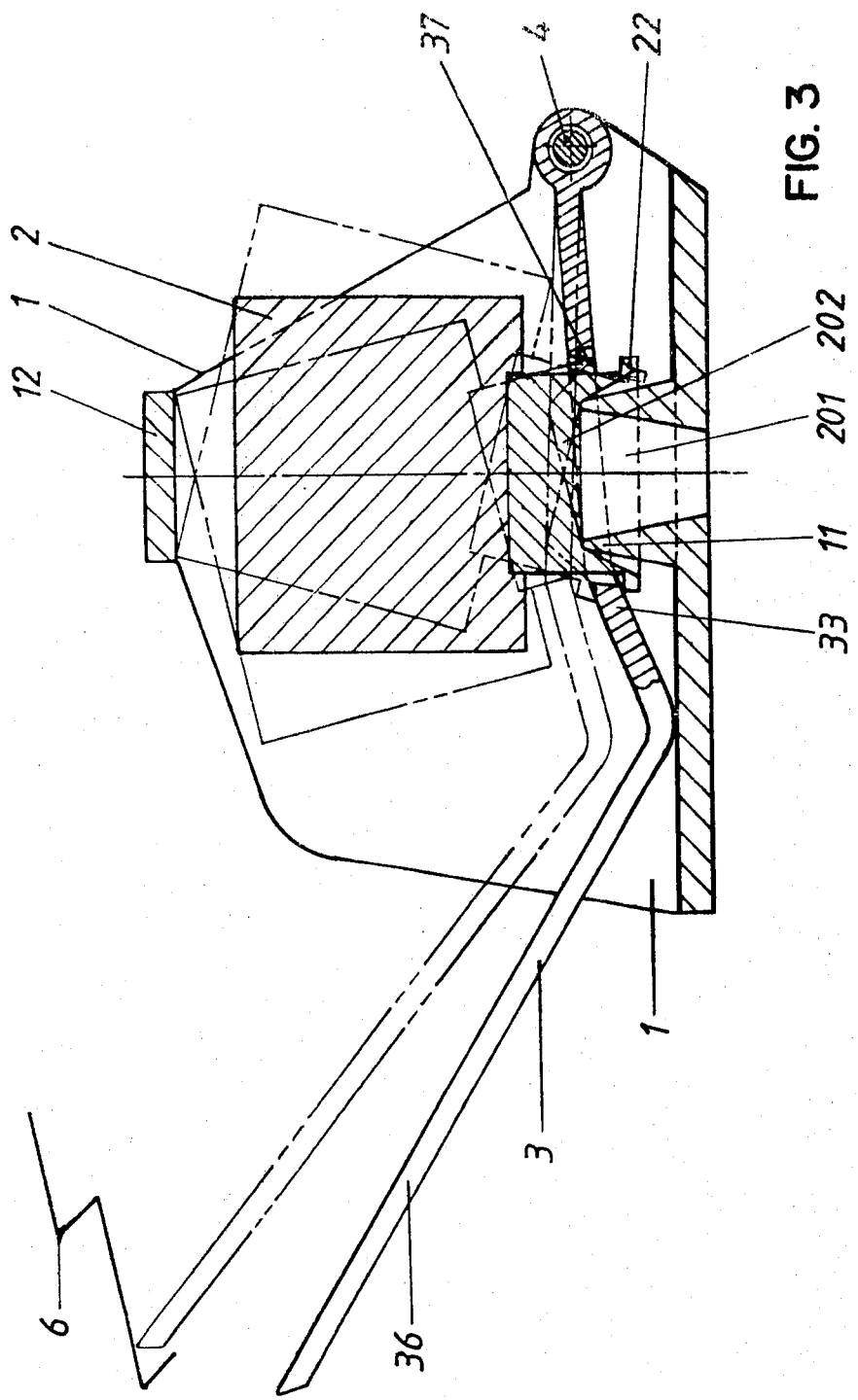
FIGS. 3–5 show similar sectional views of other embodiments.

The conditions are different in the embodiment of FIG. 3, where pawl 3 is arranged between ring collar 11 and inertia body 2. Ring collar 11 is here steeper and protrudes into recess 201 of the sleeve-shaped projection 202 on inertia body 2. At the outer bottom end, projection 202 has a flange 22 whose outside diameter is greater than that of opening 37 in ring 33 of pawl 3. Through this opening 37, the sleeve-shaped projection 202 protrudes downward from inertia body 2 arranged further above. Pawl 3 is so disconnected by sleeve 202 that it turns pawl 3 clockwise about fulcrum 4 when inertia body 2 tilts into the position shown in dot-dashed lines so that ratchet end 36 is again between the teeth of gear wheel 6. A plate 12 is provided at the top of the housing, for limiting the movement of inertia body 2. The two limiting tilted positions indicated by dot-dashed lines illustrate the function of limiting means 12.

Figure 4:
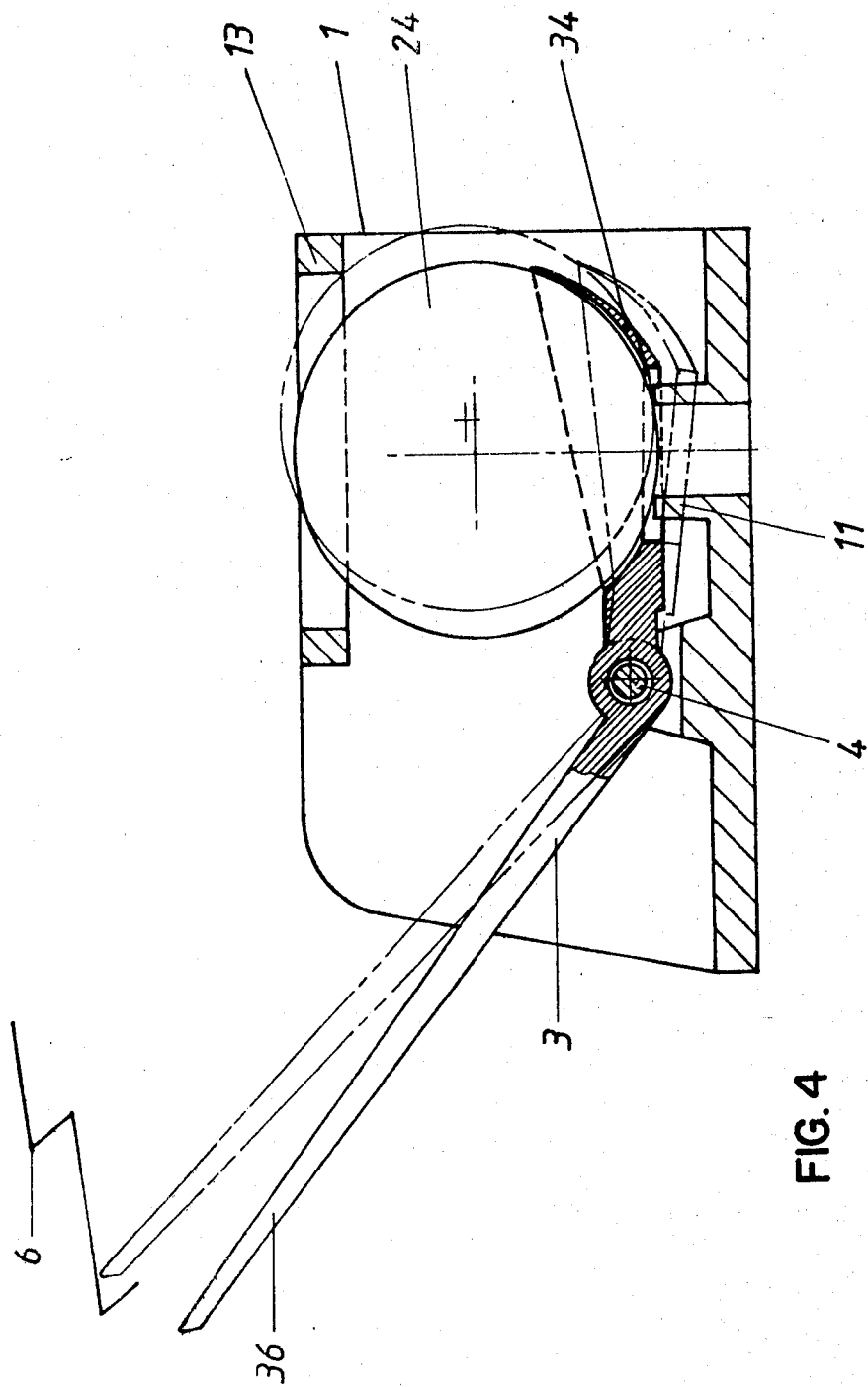
Figure 5:
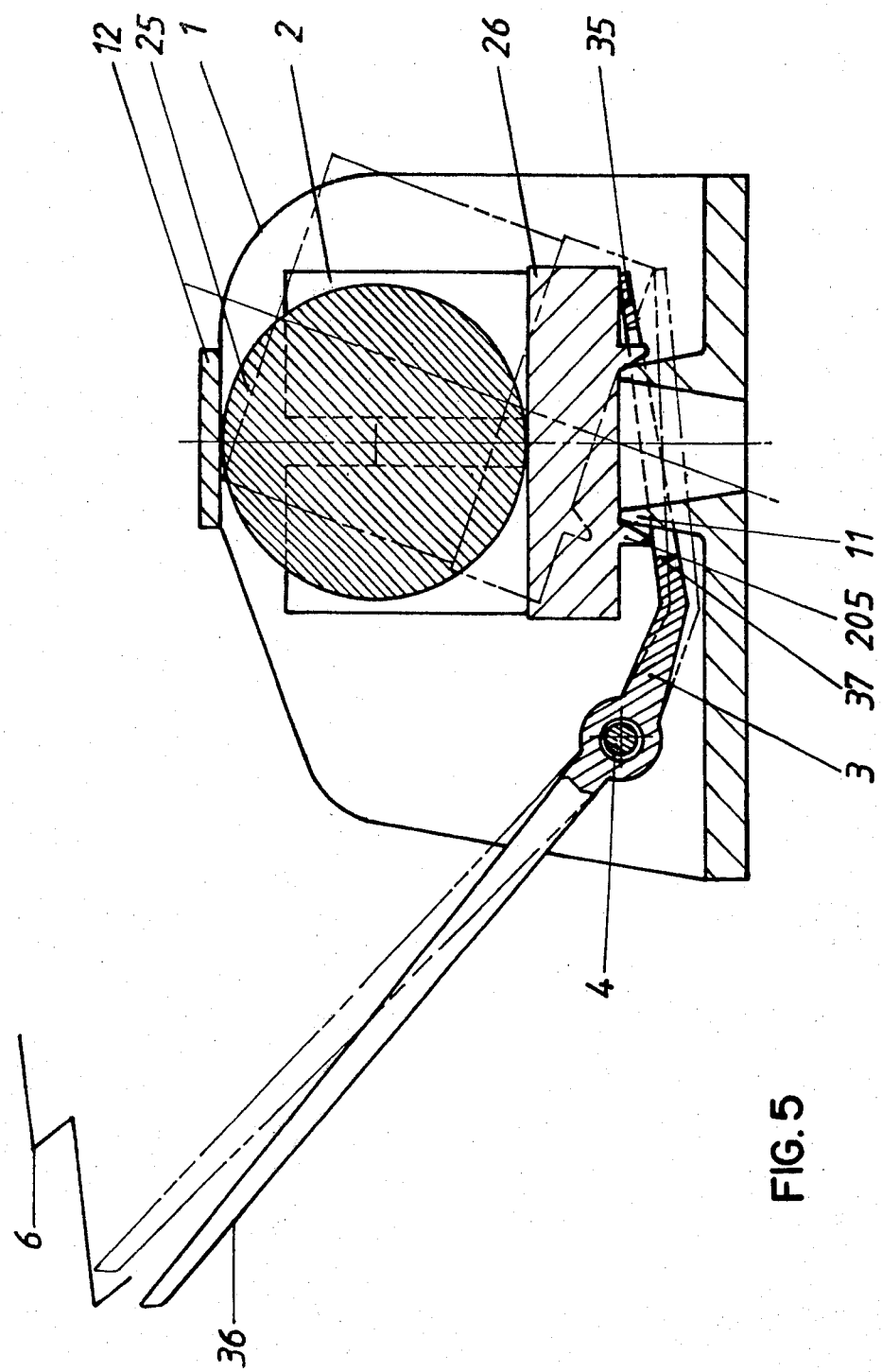

FIG. 4 shows another embodiment of the invention where inertia body 2 is designed as a ball 24. The end of pawl 3 opposite ratchet end 36 is designed as a cup-shaped trough 34 for engaging and holding ball 24. Fulcrum 4 of pawl 3 is in this embodiment on the left next to trough 34, and its distance from the extreme right end is less than from the extreme left end, that is, ratchet end 36. As a means for limiting the movement there is provided a ring 13 arranged above ball 24 and secured on the housing. As a result of a force from the right, ball 24 moves from the position indicated by solid lines into a position indicated by dot-dashed lines, and by bearing on trough 34 it moves pawl 3 clockwise around fulcrum 4 immediately after the start of the movement.

In the embodiment shown in FIG. 5 finally, the inertia body is formed of a plastic part 26 and a ball 25 inserted in the latter. Lead ball 25, for example can snap into a bearing provided at a corresponding point. Plastic part 26 is engaged with the right end 35 of pawl 3. Ring collar 11 on support 1 is here too upright, similar as in the embodiment of FIG. 3, in such a way that ring collar 11 protrudes through hole 37 in pawl 3 and downward into bead 205 on plastic part 26. Fulcrum 4 is here arranged next to hole 37 and next to the bottom region of plastic part 26.

Due to the contact between the right end 35 of pawl 3 with the bottom edge of plastic part 26, pawl 3 is turned as a result of a force immediately after the start of the tilting movement of plastic part 26 with ball 25. A plate or disk 12 is provided on top of the housing as a limiting means.

I claim:

1. For use with a safety belt retractor having a housing and a ratchet wheel, a locking mechanism which is responsive to the attitude and to the acceleration of a vehicle comprising a support having an inner upstanding annular flange and an outer upstanding annular flange, a pawl disposed below said support, pivotally connected to the housing and movable into engagement with the ratchet wheel, an inertia body disposed above said support and including an annular groove and an annular shoulder, said insertia body being carried by said support so that said inner flange engages said groove, and a rod connected to said pawl and said inertia body so that tilting movement of said inertia body about said inner flange causes a pivotal movement of said pawl, said tilting movement of said inertia body being limited by contact of said shoulder with said outer flange.

2. A locking mechanism as set forth in claim 1 wherein said support includes an aperture, said rod extending through said aperture.

3. A locking mechanism as set forth in claims 1 or 2 wherein the connections of said rod to said pawl and to said inertia body are ball and socket connections.

* * * * *